United States Patent
Sugimura

(10) Patent No.: US 6,907,970 B2
(45) Date of Patent: Jun. 21, 2005

(54) ABNORMALITY DETECTING DEVICE FOR VEHICULAR HYDRAULIC PRESSURE CONTROL CIRCUIT

(75) Inventor: Toshio Sugimura, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 10/826,378

(22) Filed: Apr. 19, 2004

(65) Prior Publication Data

US 2004/0226785 A1 Nov. 18, 2004

(30) Foreign Application Priority Data

May 15, 2003 (JP) ....................... 2003-137842

(51) Int. Cl.⁷ ............................ F16F 9/00; B60T 13/16
(52) U.S. Cl. ................... 188/382; 188/151 A; 477/906
(58) Field of Search ............................ 188/382, 151 A, 188/182; 303/1, DIG. 3, DIG. 4, 122.03, 122.05; 477/906, 129, 127, 130, 131, 152, 142, 34, 50, 158, 107, 150, 174, 146, 161, 117, 45; 701/51, 66, 62, 63; 280/5.501, 124.161; 251/129.01, 129.22

(56) References Cited

U.S. PATENT DOCUMENTS 4,973,855 A * 11/1990 Kamimura et al. ...... 280/5.501
4,978,135 A * 12/1990 Edahiro et al. .......... 280/5.501
6,733,417 B2 * 5/2004 Ajimoto .................... 477/45
2004/0226785 A1 * 11/2004 Sugimura .................. 188/182

FOREIGN PATENT DOCUMENTS

| JP | 5-118306 | 5/1993 |
| JP | 2000-266176 | 9/2000 |
| JP | 2003-49937 | 2/2003 |

* cited by examiner

Primary Examiner—Douglas C. Butler
(74) Attorney, Agent, or Firm—Oblon, Spivak, McClelland, Maier & Neustadt, P.C.

(57) ABSTRACT

In an abnormality detecting device and method for a vehicular hydraulic pressure control circuit, which determines an abnormality that has occurred in a hydraulic pressure control circuit including an electromagnetic control valve which generates hydraulic pressure corresponding to a signal supplied from an electronic control unit, and a hydraulic switch which is turned ON when the hydraulic pressure generated by the electromagnetic control valve is equal to or higher than a predetermined value, a power supply of the electronic control unit is kept ON for a predetermined time after an ignition switch is turned from ON to OFF, and an abnormality that has occurred in the hydraulic pressure control circuit is detected within the predetermined time. Thus, it is possible to reliably detect an abnormality that has occurred in the vehicular hydraulic pressure control circuit.

18 Claims, 8 Drawing Sheets

FIG.2

|  | C1 | C2 | B1 | B2 | B3 | GEAR RATIO | STEP |
|---|---|---|---|---|---|---|---|
| 1st | O |  |  | O |  | 3.194 |  |
|  |  |  |  |  |  |  | 1.650 |
| 2nd | O |  | O |  |  | 1.935 |  |
|  |  |  |  |  |  |  | 1.351 |
| 3rd | O |  |  |  | O | 1.433 |  |
|  |  |  |  |  |  |  | 1.433 |
| 4th | O | O |  |  |  | 1.000 |  |
|  |  |  |  |  |  |  | 1.465 |
| 5th |  | O |  |  | O | 0.683 |  |
|  |  |  |  |  |  |  | 1.190 |
| 6th |  | O | O |  |  | 0.574 |  |
| Rev |  |  |  | O | O | 3.586 | TOTAL 5.568 |

ABNORMALITY DETECTING DEVICE FOR VEHICULAR HYDRAULIC PRESSURE CONTROL CIRCUIT

INCORPORATION BY REFERENCE

The disclosure of Japanese Patent Application No. 2003-137842 filed on May 15, 2003, including the specification, drawings and abstract is incorporated herein by reference in its entirety.

BACKGROUND OF THE INVENTION

1. Field of the Invention

The invention relates refinement in an abnormality detecting device for detecting an abnormality which has occurred in a vehicular hydraulic pressure control circuit.

2. Description of the Related Art

Generally, an automatic transmission for a vehicle is controlled by engaging/applying or disengaging/releasing a plurality of hydraulic friction engaging devices included in the automatic transmission, using operating oil which is supplied from a predetermined hydraulic pressure control circuit. In recent years, an automatic transmission, in which each of the plurality of the hydraulic friction engaging devices is controlled by a dedicated electromagnetic control valve, is widely used. With such an automatic transmission, excellent controllability can be obtained. However, when an abnormality occurs in the plurality of the electromagnetic control valves, the automatic transmission might operate irregularly. Therefore, a technology for detecting an abnormality, which has occurred in the plurality of the electromagnetic control valves, is proposed. An example of the above-mentioned technology is applied to a hydraulic pressure control device for an automatic transmission, disclosed in Japanese Patent Laid-Open Publication No. 2003-49937. The hydraulic pressure control device for an automatic transmission includes a hydraulic switch, which detects hydraulic pressure, on the downstream side of a fail-safe valve. Therefore, an abnormality which has occurred in the plurality of the electromagnetic control valves can be detected by a single hydraulic switch.

However, in the conventional technology, when it is determined that the hydraulic switch is ON in the state where the hydraulic pressure should not be supplied, it is impossible to determine whether the hydraulic pressure is output due to an abnormality in the electromagnetic control valve, or there is an abnormality in the hydraulic switch. Namely, under present circumstances, an abnormality detecting device which can reliably detect an abnormality, that has occurred in the vehicular hydraulic pressure control circuit, has yet to be developed.

SUMMARY OF THE INVENTION

The invention is made in the light of the above-mentioned circumstances. According to an aspect of the invention, there is provided an abnormality detecting device for a vehicular hydraulic pressure control circuit, which detects an abnormality that has occurred in a hydraulic pressure control circuit including an electromagnetic control valve which generates hydraulic pressure corresponding to a signal supplied from an electronic control unit and a hydraulic switch which is turned ON when the hydraulic pressure generated by the electromagnetic control valve is equal to or higher than a predetermined value. The abnormality detecting device includes a determinator which keeps a power supply of the electronic control unit ON for a predetermined time after an ignition switch is turned from ON to OFF, and which detects an abnormality, that has occurred in the hydraulic pressure control circuit, within the predetermined time.

According to another aspect of the invention, there is provided an abnormality detecting method for a vehicular hydraulic pressure control circuit, for detecting an abnormality that has occurred in a hydraulic pressure control circuit including an electromagnetic control valve which generates hydraulic pressure corresponding to a signal supplied from an electronic control unit, and a hydraulic switch which is turned ON when the hydraulic pressure generated by the electromagnetic control valve is equal to or higher than the predetermined value. The abnormality detecting method includes the following steps of: keeping a power supply of the electronic control unit ON for a predetermined time after an ignition switch is turned from ON to OFF; and detecting an abnormality, which has occurred in the hydraulic pressure control circuit, within the predetermined time With the above-mentioned abnormality detecting device and abnormality detecting method, the power supply of the electronic control unit is kept ON for the predetermined time after the ignition switch is turned from ON to OFF, and an abnormality which has occurred in the hydraulic pressure control circuit is detected within the predetermined time. Accordingly, it is possible to compare the state in which the hydraulic pressure can be generated from the electromagnetic control valve with the state in which the hydraulic pressure cannot be generated from the electromagnetic control valve. As a result, it is possible to determine whether an abnormality has occurred in the hydraulic switch or in an element other than the hydraulic switch, such as the electromagnetic control valve. Namely, it is possible to reliably detect an abnormality which has occurred in the vehicular hydraulic pressure control circuit.

BRIEF DESCRIPTION OF THE DRAWINGS

The above-mentioned and other objects, features, advantages, technical and industrial significance of this invention will be better understood by reading the following detailed description of preferred embodiments of the invention, when considered in connection with the accompanying drawings, in which:

FIG. 2 is a table showing engaged/applied states and disengaged/released states of clutches and brakes for achieving each shift speed of an automatic transmission shown in FIG. 1;

DETAILED DESCRIPTION OF THE PREFERRED EMBODIMENTS

In the following description and the accompanying drawings, the present invention will be described in more detail with reference to exemplary embodiments.

Figure 1:
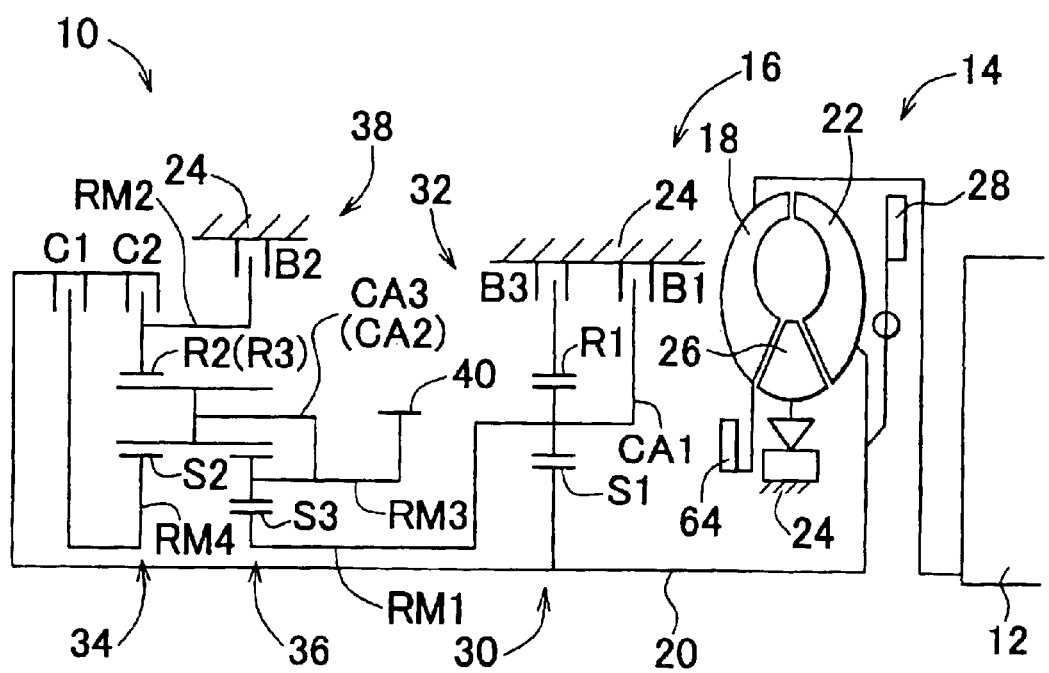
FIG. 1 is a view schematically showing a power transmission device to which an abnormality detecting device for a vehicular hydraulic pressure control circuit, according to an embodiment of the invention is applied.

FIG. 1 is a view schematically showing a power transmission device 10 to which an abnormality detecting device for a vehicular hydraulic pressure control circuit, according to an embodiment of the invention, is applied. The power transmission device 10 includes an automatic transmission 16 of a transverse type, and is appropriately applied to a FF (front engine front drive) vehicle. In the power transmission device 10, driving force generated by an engine 12, which is a driving power source for running, is transmitted to right and left wheels via a torque converter 14, the automatic transmission 16, a differential gear unit (not shown), and a pair of axles.

The engine 12 is an internal combustion engine, e.g. a gasoline engine, which generates driving force by combustion of fuel that is injected into cylinders. The torque converter 14 includes a pump impeller 18 which is coupled to a crank shaft of the engine 12, a turbine runner 22 which is coupled to an input shaft 20 of the automatic transmission 16, and a stator 26 which is coupled to a housing (transmission case) 24 of the automatic transmission 16 via a one-way clutch 27. In the torque converter 14, power is transmitted via fluid. A lock-up clutch 28 is provided between the pump impeller 18 and the turbine runner 22, and is switched among an engaged state, a slip state and a disengaged state. By fully engaging the lock-up clutch 28, the pump impeller 18 and the turbine runner 22 are integrally rotated.

The automatic transmission 16 includes a first shift portion 32, which is mainly constituted of a first planetary gear set 30 of a single pinion type, and a second shift portion 38, which is mainly constituted of a second planetary gear set 34 of a single pinion type and a third planetary gear set 36 of a double pinion type, on the same axis. In the automatic transmission 16, the rotational speed of the input shaft 20 is changed, and output from an output gear 40. The output gear 40 is meshed with the differential gear unit via a counter shaft (not shown) or directly. Since the automatic transmission 16 is substantially symmetrical with respect to the center line, the bottom half thereof is omitted in FIG. 1.

The first planetary gear set 30, which constitutes the first shift portion 32, includes three rotational elements, that are, a sun gear S1, a carrier CA1, and a ring gear R1. When the sun gear S1 is coupled to the input shaft 20 so as to be rotationally-driven, and the ring gear R1 is fixed to the housing 24 via a third brake B3 so as not to be able to rotate, the rotational speed of the carrier CA1, as an intermediate output member, is reduced with respect to the rotational speed of the input shaft 20. In the second planetary gear set 34 and the third planetary gear set 36 which constitute the second shift portion 38, a part of the second planetary gear set 34 and a part of the third planetary gear set 36 are coupled to each other, such that the four rotational elements, RM1 to RM4, are realized. More particularly, the first rotational element RM1 is constituted of a sun gear S3 of the third planetary gear set 36, the second rotational element RM2 is constituted by coupling a ring gear R2 of the second planetary gear set 34 to a ring gear R3 of the third planetary gear set 36, the third rotational element RM3 is constituted by coupling a carrier CA2 of the second planetary gear set 34 to a carrier CA3 of the third planetary gear set 36, and the fourth rotational element RM4 is constituted of a sun gear S2 of the second planetary gear set 34. Namely, in the second planetary gear set 34 and the third planetary gear set 36, the carrier CA2 and the carrier CA3 are constituted of a common member, the ring gear R2 and the ring gear R3 are constituted of a common member, and a pinion gear of the second planetary gear set 34 also serves as a second pinion gear of the third planetary gear set 36. The constitution of the second planetary gear set 34 and the third planetary gear set 36 is so-called a "Ravigneaux type".

The first rotational element RM1 (sun gear S3) is integrally coupled to the carrier CA1 of the first planetary gear set 30, which is an intermediate output member, and is selectively coupled to the housing 24 by a first brake B1 such that rotation thereof is stopped. The second rotational element RM2 (ring gears R2 and R3) is selectively coupled to the input shaft 20 via a second clutch C2, and is selectively coupled to the housing 24 by a second brake B2 such that rotation thereof is stopped. The third rotational element RM3 (carrier CA2 and CA3) is integrally coupled to the output gear 40, and outputs rotational power thereof. The fourth rotational element RM4 (sun gear S2) is selectively coupled to the input shaft 20 via a first clutch C1. Each of the first clutch C1, the second clutch C2, the first brake B1, the second brake B2, and the third brake B3 is a multiple disc friction engaging device which is frictionally engaged by a hydraulic cylinder.

FIG. 2 is a table showing engaged/applied states and disengaged/released states of the clutches and brakes for achieving each shift speed of the automatic transmission 16. In the table, a circle shows an engaged/applied state, and a blank column shows a disengaged/released state. As shown in FIG. 2, in the automatic transmission 16, the first speed is achieved by engaging the first clutch C1 and applying the second brake B2. Shifting from the first speed to the second speed (1→2 shifting) is achieved by releasing the second brake B2 and applying the first brake B1. Shifting from the second speed to the third speed (2→3 shifting) is achieved by releasing the first brake B1 and applying the third brake B3. Shifting from the third speed to the fourth speed (3→4 shifting) is achieved by releasing the third brake B3 and engaging the second clutch C2. Shifting from the fourth speed to the fifth speed (4→5 shifting) is achieved by disengaging the first clutch C1 and applying the third brake B3. Shifting from the fifth speed to the sixth speed (5→6 shifting) is achieved by releasing the third brake B3 and applying the first brake B1. The reverse speed is achieved by applying both the second brake B2 and the third brake B3.

The gear ratio of each shift speed is appropriately set based on the gear ratio ρ 1 of the first planetary gear set 30, the gear ratio ρ 2 of the second planetary gear set 34, and the gear ratio ρ 3 of the third planetary gear set 36. In this case, the gear ratio ρ is obtained by dividing the number of the teeth of the sun gear by the number of the teeth of the ring gear (ρ=the number of teeth of the sun gear/the number of the teeth of the ring gear). For example, by setting the gear ratio ρ 1 to approximately 0.60, setting the gear ratio ρ 2 to approximately 0.46, and setting the gear ratio ρ 3 to approximately 0.43, the gear ratios shown in FIG. 2 are obtained, the values of the gear ratio steps (the ratios between the gear ratios of the shift speeds) are approximately appropriate, the total gear ratio range (=3.194/0.574) is approximately 5.6, which is relatively large, the gear ratio of the reverse speed is appropriate, and appropriate gear ratio characteristics can be obtained in total.

Figure 3:
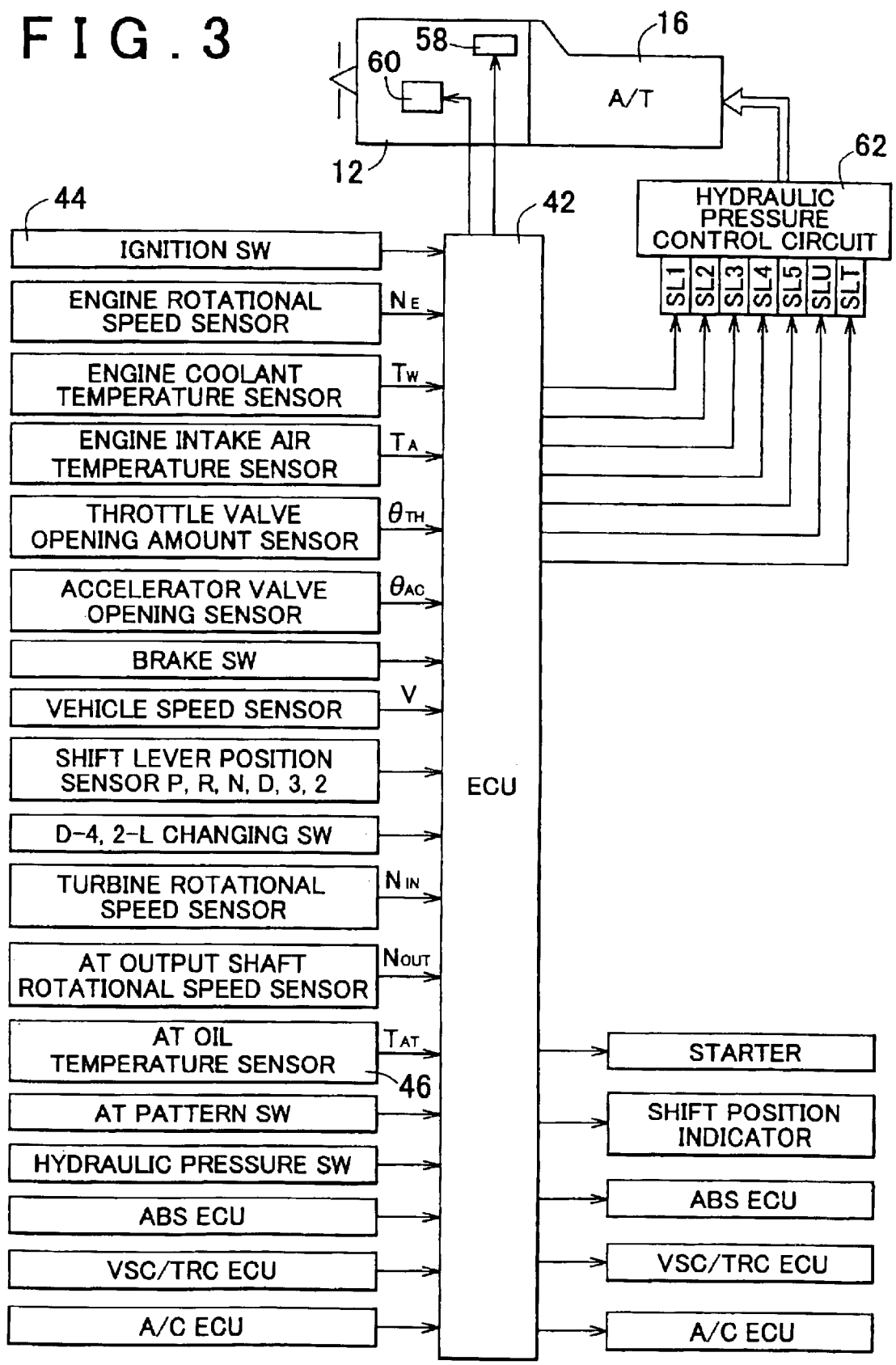
FIG. 3 is a block diagram showing an electric system provided in a vehicle, for controlling the power transmission device shown in FIG. 1.

FIG. 3 is a block diagram showing an electric system provided in a vehicle, for controlling the power transmission device 10. An electronic control unit 42 shown in FIG. 3 is a so-called microcomputer including a CPU, ROM, RAM, an interface, and the like. The electronic control unit 42 performs various controls by processing input signals according to programs stored in the ROM in advance. In the electronic control unit 42, various signals are input, such as a switch ON/OFF signal from an ignition switch 44; a signal indicative of an engine rotational speed $N_E$ from an engine rotational speed sensor; a signal indicative of an engine coolant temperature $T_W$ from an engine coolant temperature sensor; a signal indicative of an engine intake air temperature $T_A$ from an engine intake air temperature sensor; a signal indicative of a throttle valve opening amount $\theta_{TH}$ from a throttle valve opening amount sensor; a signal indicative of an accelerator pedal operation amount $\theta_{AC}$ from an accelerator pedal operation amount sensor; a signal indicative of a brake operation from a brake switch; a signal indicative of a vehicle speed V from a vehicle speed sensor; a signal indicative of a position of a shift lever in the front-rear direction from a shift lever position sensor; a signal indicative of a position of the shift lever in the right-left direction from the shift lever position sensor; a signal indicative of an input rotational speed $N_{IN}$, which is the rotational speed of the turbine runner 22 from a turbine rotational speed sensor; a signal indicative of an output rotational speed $N_{OUT}$, which is the rotational speed of the output gear 40 of the automatic transmission 16; a signal indicative of an oil temperature $T_{AT}$ of the operating oil to be supplied from an oil temperature sensor 46 to the automatic transmission 16; a signal indicative of an operation position of a shift pattern changing switch; signals indicative of engagement states of hydraulic friction engaging devices from hydraulic switches, that are, a C1 hydraulic switch 48, a C2 hydraulic switch 50, a B1 hydraulic switch 52, a B2 hydraulic switch 54, and a B3 hydraulic switch 56 are provided in the hydraulic friction engaging devices, that are, the first clutch C1, the second clutch C2, the first brake B1, the second brake B2, and the third brake B3, respectively; a signal from an electronic control unit for an ABS; a signal from an electronic control unit for VSC/TRC; and a signal from an electronic control unit for an air conditioner.

Meanwhile, from the electronic control unit 42, various signals are output, such as a fuel injection signal to a fuel injection valve 58; an ignition signal to an ignitor 60; a drive signal to a stator; an indication signal to a shift position indicator; a signal to the electronic control unit for an ABS; a signal to the electronic control unit for VSC/TRC; and a signal to the electronic control unit for the air conditioner. Also, signals for controlling driving of linear solenoid valves SL1, SL2, SL3, SL4, SL5, SLU, and SLT, which are electromagnetic control valves provided in a hydraulic pressure control circuit 62 for controlling the operation of the automatic transmission 16 are output.

Figure 4:
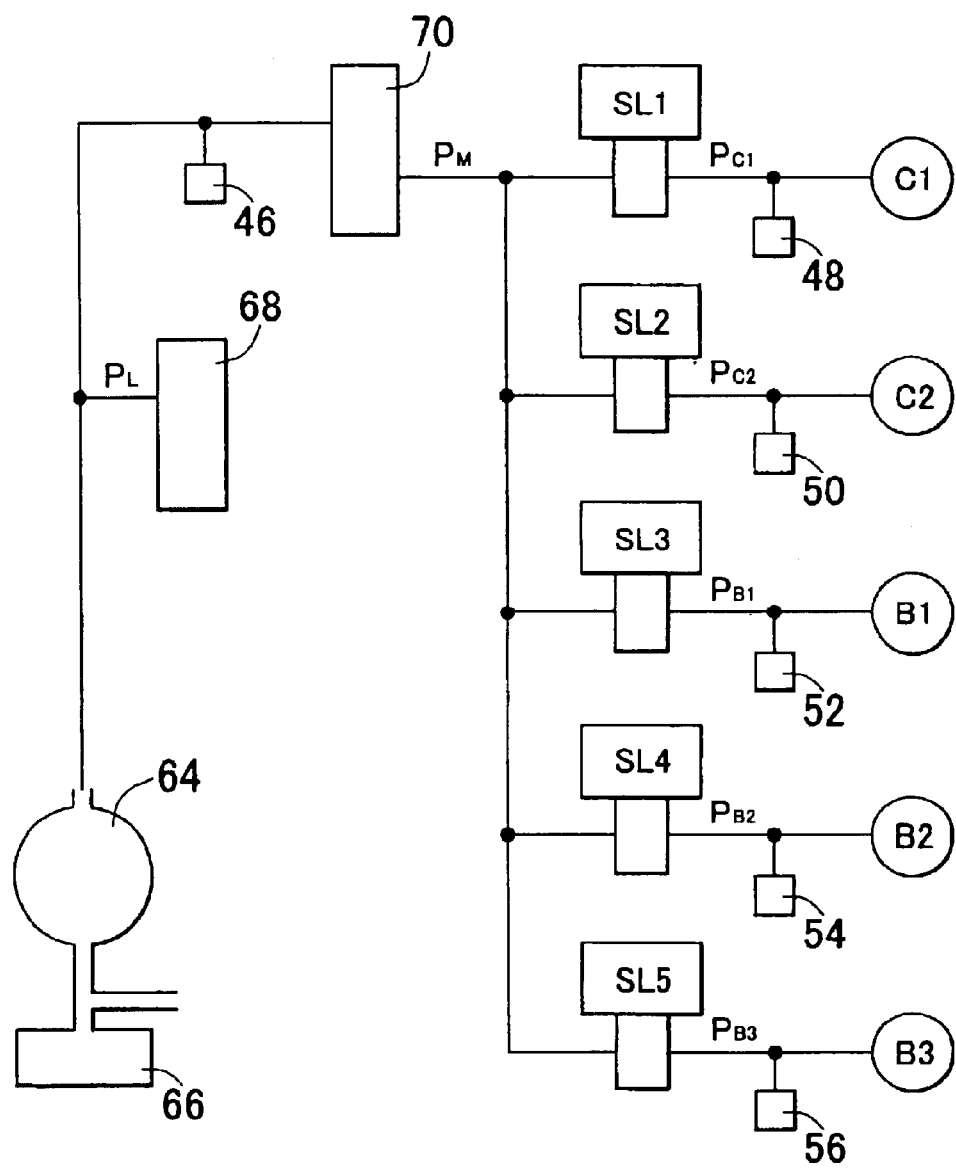
FIG. 4 is a view briefly showing a main portion of a hydraulic pressure control circuit shown in FIG. 3.

FIG. 4 is a view briefly showing a main portion of the hydraulic pressure control circuit 62. A hydraulic pump 64 shown in FIG. 4 is, for example, a mechanical hydraulic pump which sends the operating oil, that has flowed back to a strainer 66, at predetermined hydraulic pressure according to the rotational driving of the engine 12. A first regulator valve 68 regulates the hydraulic pressure supplied from the hydraulic pump 64 so as to obtain a line pressure $P_L$. A solenoid modulator valve 70 regulates the line pressure $P_L$ supplied from the first regulator valve 68 so as to obtain a modulator pressure $P_M$, and supplies the modulator pressure $P_M$ to the linear solenoid valves SL1, SL2, SL3, SL4, SL5, and the like. The linear solenoid valves SL1, SL2, SL3, SL4, and SL5 regulate the modulator pressure $P_M$ supplied from the solenoid modulator valve 70 according to the signal from the electronic control unit 42, so as to obtain a first clutch control pressure $P_{C1}$, a second clutch control pressure $P_{C2}$, a first brake control pressure $P_{B1}$, a second brake control pressure $P_{B2}$, and a third brake control pressure $P_{B3}$, respectively, and supply these pressures to the first clutch C1, the second clutch C2, the first brake B1, the second brake B2, and the third brake B3, respectively.

The oil temperature sensor 46 for detecting the temperature of the operating oil to be supplied to the automatic transmission 16 is provided on the upstream side of the solenoid modulator valve 70. On the downstream side of the solenoid valves SL1, SL2, SL3, SL4, and SL5, there are provided the C1 hydraulic switch 48, the C2 hydraulic switch 50, the B1 hydraulic pressure switch 52, the B2 hydraulic switch 54, and the B3 hydraulic switch 56, respectively. The C1 hydraulic switch 48, the C2 hydraulic switch 50, the B1 hydraulic pressure switch 52, the B2 hydraulic switch 54, and the B3 hydraulic switch 56 supply predetermined signals to the electronic control unit 42, when the hydraulic pressures for engaging the first clutch C1, the second clutch C2, the first brake B1, the second brake B2 and the third brake B3 are supplied, that is, when the first clutch control pressure $P_{C1}$, the second clutch control pressure $P_{C2}$, the first brake control pressure $P_{B1}$ the second brake control pressure $P_{B2}$, and the third brake control pressure $P_{B3}$ are equal to or higher than predetermined values, respectively.

Figure 5:
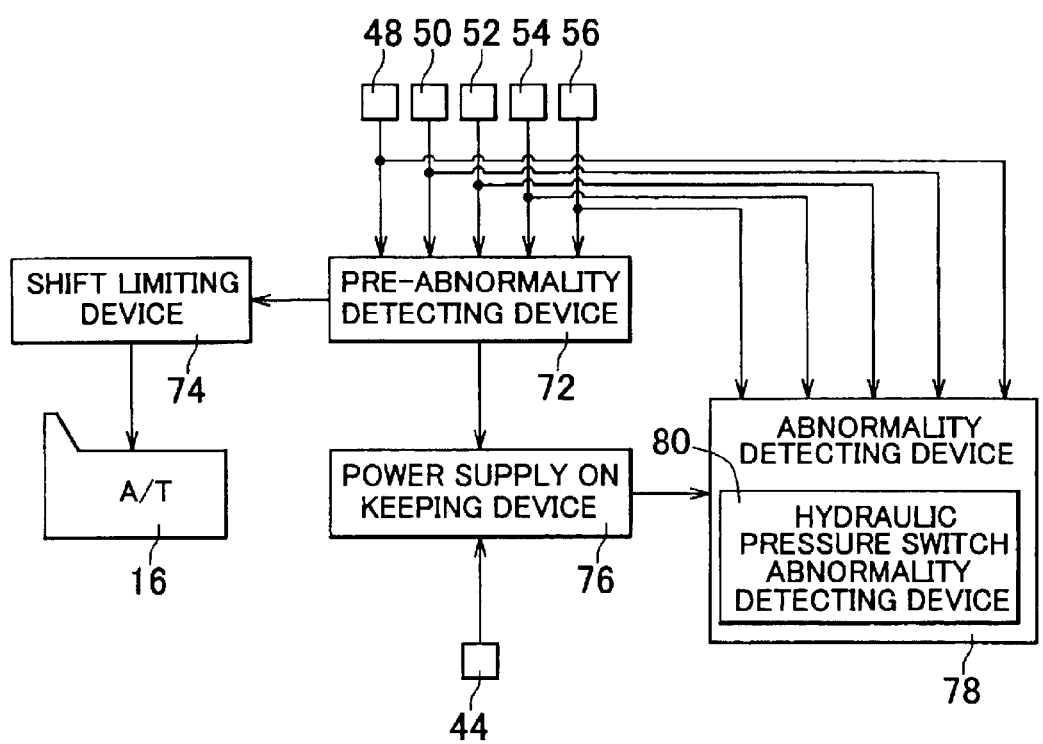
FIG. 5 is a functional block diagram showing a main portion of a control function of an electronic control unit shown in FIG. 3.

FIG. 5 is a functional block diagram showing a main portion of a control function of the electronic control unit 42. A pre-abnormality detecting device 72 shown in FIG. 5 determines whether the hydraulic switches provided in the electromagnetic control valves, that are, the C1 hydraulic switch 48, the C2 hydraulic switch 50, the B1 hydraulic switch 52, the B2 hydraulic switch 54, and the B3 hydraulic switch 56 are turned ON, when the hydraulic pressures generated by the electromagnetic control valves, that are, the linear solenoid valves SL1, SL2, SL3, SL4, and SL5 should be lower than predetermined values. The hydraulic pressures generated by the electromagnetic control valves should be lower than the predetermined values, for example, when the engine is started, that is, immediately after the ignition switch 44 is turned from OFF to ON, or when the frictional engaging device corresponds to the hydraulic friction engaging device corresponding to the blank column in the table shown in FIG. 2, that is, the hydraulic friction engaging device which should not be engaged in the shift speed.

A shift restricting device 74 restricts shifting to a predetermined shift speed, when an affirmative determination is made by the pre-abnormality detecting device 72. Namely, the pre-abnormality detecting device 72 restricts shifting to shift speeds other than the shift speed where the hydraulic friction engaging device corresponding to the hydraulic switch, for which the affirmative determination was made by the pre-abnormality detecting device 72, is engaged. For example, when it is determined that Cl hydraulic switch 48 (corresponding to the first clutch C1) is ON by the pre-abnormality detecting device 72, shifting to the fifth speed and shifting to the sixth speed are prohibited.

Figure 6:
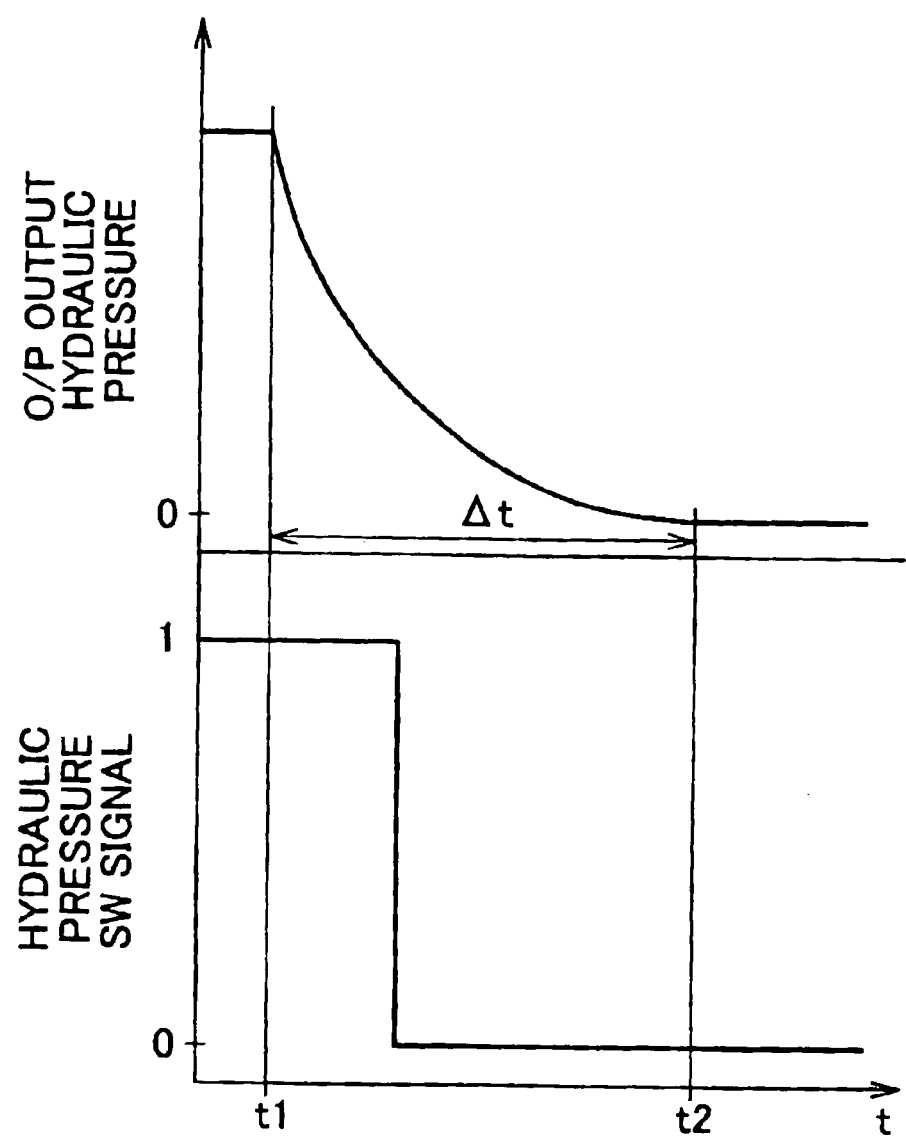
FIG. 6 is a time chart showing attenuation of the hydraulic pressure output from an hydraulic pump after an ignition switch shown in FIG. 3 is turned from ON to OFF, and a change in a signal according to the attenuation when a hydraulic switch is operating normally.

A power supply ON keeping device 76 keeps the power supply of the electronic control unit 42 ON for a predetermined time, after the ignition switch 44 is turned from ON to OFF, that is, after driving of the engine 12 is stopped, when an affirmative determination is made by the pre-abnormality detecting device 72. As shown in FIG. 6, the hydraulic pressure output from the hydraulic pump 64 starts decreasing immediately after the ignition switch 44 is turned from ON to OFF at time t1, and is attenuated simply until the hydraulic pressure become "0" at time t2. The predetermined time in which the power supply of the electronic control unit 42 is kept ON by the power supply ON keeping device 76 is the predetermined time Δt shown in FIG. 6, that is, the time until the hydraulic pressure output from the hydraulic pump 64 becomes "0".

An abnormality detecting device 78 detects an abnormality, that has occurred in the hydraulic pressure control circuit 62, within the predetermined time where the power supply of the electronic control unit 42 is kept ON by the power supply ON keeping device 76. Preferably, such detection is performed only after an affirmative determination is made by the pre-abnormality detecting device 72, the abnormality detecting device 78 includes a hydraulic switch abnormality detecting device 80 which determines whether the hydraulic switch, for which the affirmative determination was made by the pre-abnormality detecting device 72, is kept ON for the predetermined time, and when an affirmative determination is made by the hydraulic switch abnormality detecting device 80, it is determined that an abnormality has occurred in the hydraulic switch for which the affirmative determination was made by the pre-abnormality detecting device 72. When a negative determination is made by the hydraulic switch abnormality detecting device 80, that is, when the hydraulic switch, for which the affirmative determination was made by the pre-abnormality detecting device 72, is turned OFF in the predetermined time, it is determined that an abnormality has occurred in the electromagnetic control valve corresponding to the hydraulic switch, for which the affirmative determination was made by the pre-abnormality detecting device 72, or in the oil passage between the electromagnetic control valve and the hydraulic switch. When the hydraulic switch is operating normally, as shown in FIG. 6, the signal of the hydraulic switch is turned OFF according to a decrease in the hydraulic pressure output from the hydraulic pump 64. Therefore, by detecting an abnormality that has occurred in the hydraulic pressure control circuit 62 within the predetermined time where driving of the engine 12 is stopped and the power supply of the electronic control unit 42 is kept ON, it is possible to determine whether the abnormality is caused by the hydraulic switch or by the electromagnetic control valve.

Figure 7A:
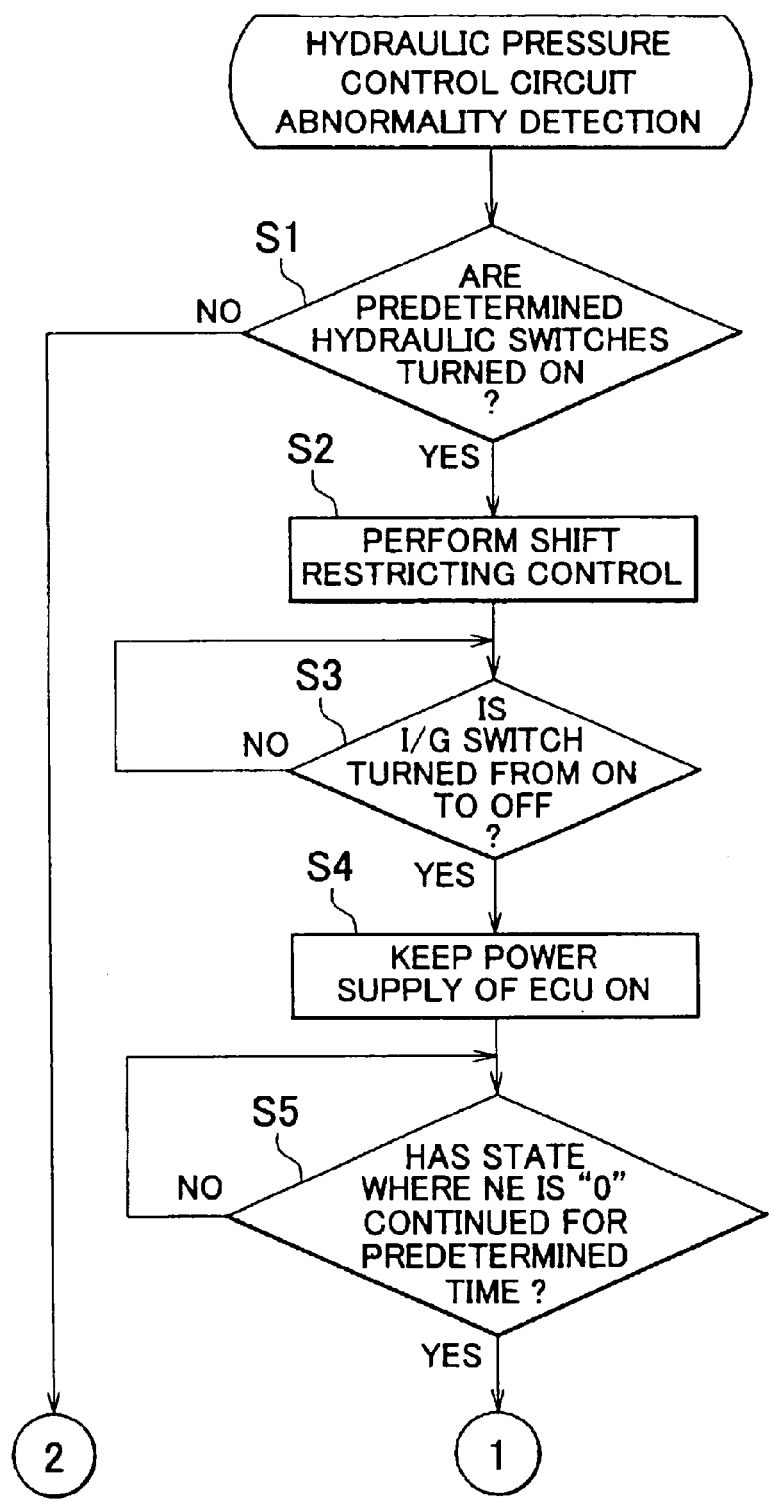
FIGS. 7A and 7B are flowcharts describing a main portion of an abnormality determining operation of the hydraulic pressure control circuit, performed by the electronic control unit shown in FIG. 3.
Figure 7B:
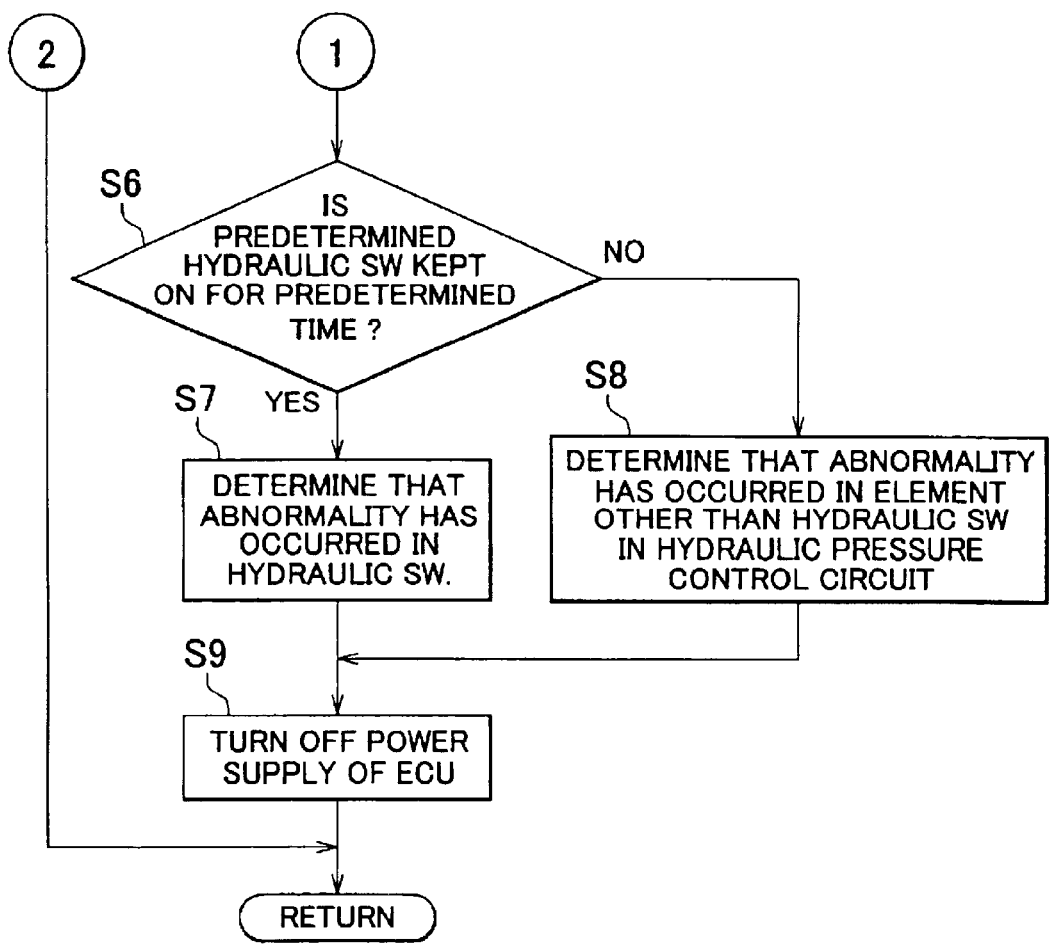

FIGS. 7A and 7B are flowcharts describing a main portion of an abnormality determination operation for the hydraulic pressure control circuit 62, which is performed by the electronic control unit 42. The routine shown in the flowchart is repeatedly performed at a considerably short cycle time between several msec and several tens of msec.

First, in step S1 (hereinafter, simply referred to as "S1". The same can be applied to the other steps) corresponding to the pre-abnormality detecting device 72, it is determined whether the hydraulic switches provided in the electromagnetic control valves, that are, the C1 hydraulic switch 48, the C2 hydraulic switch 50, the B1 hydraulic switch 52, the B2 hydraulic switch 54, and the B3 hydraulic switch 56, are turned ON in the state where the hydraulic pressures generated by the electromagnetic control valves, that are, the linear solenoid valves Sl1, SL2, SL3, SL4, and SL5 should be equal to or lower than the predetermined values. When a negative determination is made in S1, the routine ends. On the other hand, when an affirmative determination is made in S1, next, in S2 corresponding to the shift control device 74, shifting to the shift speeds other than the shift speed where the hydraulic friction engaging device corresponding to the hydraulic switch, for which the affirmative determination was made in S1, is restricted. Next, in S3, it is determined whether the ignition switch 44 is turned from ON to OFF. As long as a negative determination is made in S3, S3 is repeatedly performed, and the process does not proceed to S4. On the other hand, when an affirmative determination is made in S3, the power supply of the electronic control unit 42 is kept ON in S4.

Next, in S5, it is determined whether the state in which the engine rotational speed NE is "0" continues for a predetermined time. As long as a negative determination is made in S5, S5 is repeatedly performed, and the process does not proceeds to S6. On the other hand, when an affirmative determination is made in S5, next, in S6 corresponding to the hydraulic switch abnormality detecting device 80, it is determined whether the hydraulic switch, for which the affirmative determination was made in S1, is kept ON for the predetermined time. When an affirmative determination is made in S6, next, in S7, it is determined that an abnormality has occurred in the hydraulic switch, for which the affirmative determination was made in S1. Then, the power supply of the electronic control unit 42 is turned OFF in S9, afterwhich the routine ends. On the other hand, when a negative determination is made in S6, it is determined that an abnormality has occurred in an element other than the hydraulic switch, for which the affirmative determination was made in S1, in the hydraulic pressure control circuit. For example, in S8, it is determined that an abnormality has occurred in the electromagnetic control valve (a valve stick) corresponding to the hydraulic switch, for which the affirmative determination was made in S1, or the oil passage between the electromagnetic control valve and the hydraulic switch. Then, the power supply of the electronic control 42 is turned OFF in S9, afterwhich the routine ends. In the above-mentioned control, S4, S5 and S9 correspond to the power supply ON keeping device 76, and S6 to S8 correspond to the abnormality detecting device 78.

According to the embodiment, there is provided the abnormality detecting device 78 (S6 to S8) which keeps the power supply of the electronic control unit 42 ON for the predetermined time after the ignition switch 44 is turned from ON to OFF, and which detects an abnormality that has occurred in the hydraulic pressure control circuit 62 within the predetermined time. Therefore, it is possible to compare the state where the hydraulic pressures can be generated from the electromagnetic control valves, that are, the linear solenoid valves SL1, SL2, SL3, SL4, and SL5, with the state where the hydraulic pressures cannot be generated from the above-mentioned valves. Accordingly, it is possible to determine the hydraulic switch in which an abnormality has occurred, among the electromagnetic control valves and the hydraulic switches, that are, the C1 hydraulic switch 48, the C2 hydraulic switch 50, the B1 hydraulic switch 52, the B2 hydraulic switch 54, and the B3 hydraulic switch 56. Namely, it is possible to provide the abnormality detecting device which can accurately detect an abnormality that has occurred in the vehicular hydraulic pressure control circuit.

Also, the abnormality detecting device 78 includes the hydraulic switch abnormality detecting device 80 (S6) which determines whether the hydraulic switch is kept ON for the predetermined time. When an affirmative determination is made by the hydraulic switch abnormality detecting device 80, it is determined that an abnormality has occurred in the hydraulic switch. When a negative determination is made by the hydraulic switch abnormality detecting device 80, it is determined that an abnormality has occurred in the electromagnetic control valve. Therefore, it is possible to appropriately determine whether an abnormality has occurred in the electromagnetic control valve or in the hydraulic switch.

The abnormality detecting device 78 detects an abnormality that has occurred in the hydraulic pressure control circuit 62, when the hydraulic switch is turned ON in the case where the hydraulic pressure generated by the electromagnetic control valve should be lower than the predetermined value. Accordingly, by detecting an abnormality that has occurred in the vehicular hydraulic pressure control circuit as required, unnecessary control is not performed.

While the invention has been described with detail with reference to the preferred embodiment, the invention is not limited to the above-mentioned embodiment, and the invention may be realized in various other embodiments.

For example, in the above-mentioned embodiment, description is made regarding the power transmission device 10 in which the mechanical hydraulic pump 64, that generated the hydraulic pressure according to the rotational driving of the engine 12, is provided. However, the invention may be applied to a power transmission device in which an electric hydraulic pump is provided. In this case, driving of the electric hydraulic pump is stopped when the ignition switch 44 is turned from ON to OFF. Also, driving of the electric hydraulic pump is started when the ignition switch 44 is turned from OFF to ON.

Also, in the above-mentioned embodiment, the invention is applied to the vehicle provided with the multi-speed automatic transmission 16 including a plurality of planetary gear sets. However, the invention may be applied to a vehicle including a belt type or a toroidal type continuously variable transmission in which a gear ratio can be continuously changed.

Also, in the above-mentioned embodiment, a plurality of the hydraulic friction engaging devices and a plurality of the hydraulic switches are provided such that each hydraulic friction engaging device has a dedicated hydraulic switch. However, the invention may be applied to a vehicle including a hydraulic pressure control circuit in an embodiment in which the engagement states of the plurality of the hydraulic friction engaging devices are determined using one hydraulic switch or hydraulic switches whose number is smaller than the number of the hydraulic friction engaging devices.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations, including more, less or only a single element, are also within the spirit and scope of the invention.

What is claimed is:

1. An abnormality detecting device for a vehicular hydraulic pressure control circuit, which detects an abnormality that has occurred in a hydraulic pressure control circuit including an electromagnetic control valve which generates hydraulic pressure corresponding to a signal supplied from an electronic control unit, and a hydraulic switch which is turned ON when the hydraulic pressure generated by the electromagnetic control valve is equal to or higher than a predetermined value, comprising:
    a determinator which keeps a power supply of the electronic control unit ON for a predetermined time after an ignition switch is turned from ON to OFF, and which detects an abnormality that has occurred in the hydraulic pressure control circuit based upon a determination made within the predetermined time.

2. The abnormality detecting device for a vehicular hydraulic pressure control circuit, according to claim 1, wherein the determinator determines whether the hydraulic switch is kept ON for the predetermined time, determines that an abnormality has occurred in the hydraulic switch when an affirmative determination is made in the determination, and determines that an abnormality has occurred in an element other than the hydraulic switch in the hydraulic pressure control circuit when a negative determination is made in the determination.

3. The abnormality detecting device for a vehicular hydraulic pressure control circuit, according to claim 2, wherein the determinator determines that an abnormality has occurred in the electromagnetic control valve when a negative determination is made in the determination.

4. The abnormality detecting device for a vehicular hydraulic pressure control circuit, according to claim 2, wherein the determinator determines that an abnormality has occurred in an oil passage between the electromagnetic control valve and the hydraulic switch, when a negative determination is made in the determination.

5. The abnormality detecting device for a vehicular hydraulic pressure control circuit, according to claim 2, wherein the determinator detects an abnormality that has occurred in the hydraulic pressure control circuit, when the hydraulic switch is turned ON in the case where the hydraulic pressure generated by the electromagnetic control valve should be lower than the predetermined value.

6. The abnormality detecting device for a vehicular hydraulic pressure control circuit, according to claim 1, wherein the determinator detects an abnormality that has occurred in the hydraulic pressure control circuit, when the hydraulic switch is turned ON in the case where the hydraulic pressure generated by the electromagnetic control valve should be lower than the predetermined value.

7. An abnormality detecting device for a vehicular hydraulic pressure control circuit, which detects an abnormality that has occurred in a hydraulic pressure control circuit including an electromagnetic control valve which generates hydraulic pressure corresponding to a signal supplied from an electronic control unit, and a hydraulic switch which is turned ON when the hydraulic pressure generated by the electromagnetic control valve is equal to or higher than a predetermined value, comprising:
    abnormality detecting means for keeping a power supply of the electronic control unit ON for a predetermined time after an ignition switch is turned from ON to OFF, and for detecting an abnormality that has occurred in the hydraulic pressure control circuit based upon a determination made within the predetermined time.

8. The abnormality detecting device for a vehicular hydraulic pressure control circuit, according to claim 7, wherein the abnormality detecting means includes hydraulic switch abnormality detecting means for determining whether the hydraulic switch is kept ON for the predetermined time, determines that an abnormality has occurred in the hydraulic switch when an affirmative determination is made by the hydraulic switch abnormality detecting means, and determines that an abnormality has occurred in an element other than the hydraulic switch in the hydraulic pressure control circuit when a negative determination is made by the hydraulic switch abnormality detecting means.

9. The abnormality detecting device for a vehicular hydraulic pressure control circuit, according to claim 8, wherein the abnormality detecting means determines that an abnormality has occurred in the electromagnetic control valve, when a negative determination is made by the hydraulic switch abnormality detecting means.

10. The abnormality detecting device for a vehicular hydraulic pressure control circuit, according to claim 8, wherein the abnormality detecting means determines that an abnormality has occurred in an oil passage between the electromagnetic control valve and the hydraulic switch, when a negative determination is made by the hydraulic switch abnormality detecting means.

11. The abnormality detecting device for a vehicular hydraulic pressure control circuit, according to claim 8, characterized in that the abnormality detecting means detects an abnormality that has occurred in the hydraulic pressure control circuit, when the hydraulic switch is turned ON in the case where the hydraulic pressure generated by the electromagnetic control valve should be lower than the predetermined value.

12. The abnormality detecting device for a vehicular hydraulic pressure control circuit, according to claim 7, characterized in that the abnormality detecting means detects an abnormality that has occurred in the hydraulic pressure control circuit, when the hydraulic switch is turned ON in the case where the hydraulic pressure generated by the electromagnetic control valve should be lower than the predetermined value.

13. An abnormality detecting method for a vehicular hydraulic pressure control circuit, for detecting an abnormality that has occurred in a hydraulic pressure control circuit including an electromagnetic control valve which generates hydraulic pressure corresponding to a signal supplied from an electronic control unit, and a hydraulic switch which is turned ON when the hydraulic pressure generated by the electromagnetic is equal to or higher than a predetermined value, comprising the steps of:

keeping a power supply of the electronic control unit ON for a predetermined time after an ignition switch is turned from ON to OFF; and detecting an abnormality that has occurred in the hydraulic pressure control circuit based upon a determination made within the predetermined time.

14. The abnormality detecting method for a vehicular hydraulic pressure control circuit, according to claim 13, further comprising the following steps of:

determining whether the hydraulic switch is kept ON for the predetermined time;

determining that an abnormality has occurred in the hydraulic switch when an affirmative determination is made in the determination; and determining that an abnormality has occurred in an element other than the hydraulic switch in the hydraulic pressure control circuit when a negative determination is made in the determination.

15. The abnormality detecting method for a vehicular hydraulic pressure control circuit, according to claim 14, wherein it is determined that an abnormality has occurred in the electromagnetic control valve when a negative determination is made in the determination.

16. The abnormality detecting method for a vehicular hydraulic pressure control circuit, according to claim 14, wherein it is determined that an abnormality has occurred in an oil passage between the electromagnetic control valve and the hydraulic switch, when a negative determination is made in the determination.

17. The abnormality detecting method for a vehicular hydraulic pressure control circuit, according to claim 14, further comprising the step of:

detecting an abnormality that has occurred in the hydraulic pressure control circuit, when the hydraulic switch is turned ON in the case where the hydraulic pressure generated by the electromagnetic control valve should be lower than the predetermined value.

18. The abnormality detecting method for a vehicular hydraulic pressure control circuit, according to claim 13, further comprising the step of:

detecting an abnormality that has occurred in the hydraulic pressure control circuit, when the hydraulic switch is turned ON in the case where the hydraulic pressure generated by the electromagnetic control valve should be lower than the predetermined value.

* * * * *